United States Patent
De Bock et al.

(10) Patent No.: US 11,828,284 B2
(45) Date of Patent: Nov. 28, 2023

(54) SCREW COMPRESSOR ELEMENT AND MACHINE

(71) Applicants: ATLAS COPCO AIRPOWER, NAAMLOZE VENNOOTSCHAP, Wilrijk (BE); AKTIEBOLAGET SKF, Gothenburg (SE)

(72) Inventors: Simon De Bock, Wilrijk (BE); Tom De Rooster, Leest (BE)

(73) Assignees: ATLAS COPCO AIRPOWER, NAAMLOZE VENNOOTSCHAP, Wilrijk (BE); AKTIEBOLAGET SKF, Gothenburg (SE)

( * ) Notice: Subject to any disclaimer, the term of this patent is extended or adjusted under 35 U.S.C. 154(b) by 130 days.

(21) Appl. No.: 17/042,595

(22) PCT Filed: Mar. 26, 2019

(86) PCT No.: PCT/IB2019/052420
§ 371 (c)(1),
(2) Date: Sep. 28, 2020

(87) PCT Pub. No.: WO2019/186374
PCT Pub. Date: Oct. 3, 2019

(65) Prior Publication Data
US 2021/0095667 A1    Apr. 1, 2021

Related U.S. Application Data

(60) Provisional application No. 62/649,839, filed on Mar. 29, 2018.

(30) Foreign Application Priority Data

Mar. 25, 2019    (BE) .................................. 2019/5184

(51) Int. Cl.
*F04C 18/16* (2006.01)
*F16C 19/49* (2006.01)
(Continued)

(52) U.S. Cl.
CPC .............. *F04C 18/16* (2013.01); *F16C 19/49* (2013.01); *F16C 19/546* (2013.01); *F16C 19/56* (2013.01);
(Continued)

(58) Field of Classification Search
CPC ...... F04C 18/16; F04C 29/02; F04C 2240/50; F04C 2240/52; F16C 19/49; F16C 19/546;
(Continued)

(56) References Cited

U.S. PATENT DOCUMENTS 3,388,854 A  *  6/1968  Olofsson ................ F16C 25/083
                                                          418/203
4,119,392 A  *  10/1978  Breckheimer ........ F04C 28/185
                                                          418/21
(Continued)

FOREIGN PATENT DOCUMENTS

DE    10 2006 015 111 A1    10/2007
DE       102006033777 A1 *   1/2008  .............. F01C 21/02
(Continued)

OTHER PUBLICATIONS

English Machine Translation of DE102006033777A (Year: 2008).*
(Continued)

*Primary Examiner* — Dominick L Plakkoottam
*Assistant Examiner* — Paul W Thiede
(74) *Attorney, Agent, or Firm* — Sughrue Mion, PLLC

(57) ABSTRACT

A screw compressor element may have a housing; a cylinder bearing including an inner ring, an outer ring, a raceway, and a cylindrical rolling element that contacts the inner ring and
(Continued)

the outer ring at a location of the raceway thereof; and a ball bearing including an inner ring, an outer ring, a raceway, and a ball shaped rolling element that contacts the inner ring and the outer ring at a location of the raceway thereof, wherein a rotor is rotatably arranged by way of the cylinder bearing and the ball bearing.

15 Claims, 2 Drawing Sheets

(51) Int. Cl.
| | | |
|---|---|---|
| *F16C 19/56* | (2006.01) | |
| *F16C 19/54* | (2006.01) | |
| *F16C 19/16* | (2006.01) | |
| *F04C 29/02* | (2006.01) | |
| *F01C 21/02* | (2006.01) | |

(52) U.S. Cl.
CPC .............. *F01C 21/02* (2013.01); *F04C 29/02* (2013.01); *F04C 2240/50* (2013.01); *F04C 2240/52* (2013.01); *F05C 2203/08* (2013.01); *F05C 2225/00* (2013.01); *F05C 2225/12* (2013.01); *F16C 19/163* (2013.01); *F16C 2206/40* (2013.01); *F16C 2240/76* (2013.01)

(58) Field of Classification Search
CPC .... F16C 19/56; F16C 19/163; F16C 2206/40; F16C 2240/76; F16C 25/083; F01C 21/02; F05C 2203/08; F05C 2225/00; F05C 2225/12
See application file for complete search history.

(56) References Cited

U.S. PATENT DOCUMENTS

| | | | | |
|---|---|---|---|---|
| 4,465,446 | A | 8/1984 | Nemit, Jr. et al. | |
| 5,273,413 | A | 12/1993 | Wallin | |
| 5,409,359 | A | 4/1995 | Takano et al. | |
| 7,006,953 | B2 * | 2/2006 | Takemura | G07C 3/00 |
| | | | | 703/2 |
| 7,588,371 | B2 * | 9/2009 | Moller | F16C 19/166 |
| | | | | 384/906 |
| 7,594,757 | B2 * | 9/2009 | Verhaegen | F16C 33/6651 |
| | | | | 384/313 |
| 7,703,746 | B2 * | 4/2010 | Habibvand | F16C 33/303 |
| | | | | 384/454 |
| 7,828,536 | B2 * | 11/2010 | Van Leuven | F01C 21/02 |
| | | | | 418/201.1 |
| 10,711,836 | B2 * | 7/2020 | Grubbauer | F16C 19/163 |
| 2004/0050081 | A1 * | 3/2004 | Tsuboi | F25B 31/008 |
| | | | | 62/193 |
| 2008/0285906 | A1 * | 11/2008 | Georgi | F16C 19/163 |
| | | | | 384/618 |
| 2010/0061672 | A1 * | 3/2010 | Dizlek | F16C 19/49 |
| | | | | 384/505 |
| 2014/0314358 | A1 * | 10/2014 | Seubert | F16C 35/077 |
| | | | | 384/454 |
| 2015/0118092 | A1 * | 4/2015 | Takaki | F04C 15/0042 |
| | | | | 418/73 |
| 2016/0153494 | A1 * | 6/2016 | Kullin | F16C 23/08 |
| | | | | 384/558 |
| 2016/0312823 | A1 | 10/2016 | De Rooster et al. | |
| 2018/0058452 | A1 * | 3/2018 | Yuki | F04C 29/12 |

FOREIGN PATENT DOCUMENTS

| | | | |
|---|---|---|---|
| DE | 102008025352 A1 * | 12/2009 | ............. F16C 19/49 |
| DE | 20 2016 106 895 U1 | 2/2017 | |
| EP | 1 845 265 A1 | 10/2007 | |
| EP | 2 642 145 A1 | 9/2013 | |
| EP | 2 891 764 A1 | 7/2015 | |
| JP | 6-280860 A | 10/1994 | |
| JP | 2002-372051 A | 12/2002 | |
| JP | 2014-190453 A | 10/2014 | |
| WO | 2008/092416 A1 | 8/2008 | |
| WO | 2010/088363 A1 | 8/2010 | |

OTHER PUBLICATIONS

Bearing Load Scenarios by Kaydon dated Apr. 20, 2013 (Year: 2013).*
International Search Report for PCT/IB2019/052420 dated, Jul. 5, 2019 (PCT/ISA/210).
Written Opinion of the International Searching Authority for PCT/IB2019/052420 dated, Jul. 5, 2019 (PCT/ISA/237).
Written Opinion of the International Preliminary Examining Authority for PCT/IB2019/052420 dated, Feb. 19, 2020 (PCT/IPEA/408).
International Preliminary Report on Patentability for PCT/IB2019/052420 dated, Jul. 15, 2020 (PCT/IPEA/409).
European Office Action dated Feb. 23, 2023 in European Application No. 19 721 074.3.

* cited by examiner

SCREW COMPRESSOR ELEMENT AND MACHINE

BACKGROUND

Field

The present invention relates to a screw compressor element.

Description of Related Art

More specifically, the invention relates to a screw compressor element provided with a housing wherein a rotor is rotatably arranged by way of two bearings, respectively a cylinder bearing and a ball bearing. A cylinder bearing is also referred to as a roller bearing.

Preferably, the rotational speed of screw compressors is as high as possible in order to allow for the generation of as much compressed gas as possible. For oil-injected screw compressors, the rotational speed is still limited by the so-called hydraulic loss, but in oil-free screw compressors, no liquid enters the compression chamber, for which reason there is no hydraulic loss, and the highest possible rotational speed is desirable in order to generate a maximum output. The same applies to oil-free screw or roots blowers, oil-free screw or roots vacuum pumps, oil-free tooth compressors and tooth vacuum pumps.

During the compression of the gas, the so-called "gas forces" will exercise considerable forces on the rotors, in a radial as well as in an axial direction, and therefore on the bearings.

One requirement for bearings that are used in a screw compressor is that they must have a considerable load-bearing capacity, and furthermore, that they must also be suitable for very high rotational speeds, specifically in case of oil-free screw compressors.

However, in order to make the load-bearing capacity as high as possible, bearings are preferably made as large as possible and comprise the largest possible rolling elements, whereas for high speed applications, bearings should be as small as possible, and comprise the smallest possible rolling elements.

At higher speeds, it is harder to supply the oil to the bearing and drain the oil from the bearing, in particular and mostly towards the raceways, and specifically towards the raceway on the inner ring, where the oil is intended to provide lubrication and cooling. The rotating rolls or balls themselves, whether encased in a bearing cage or not, continuously interrupt the oil supply and thus generate swirling motions to such an extent that the oil is barely capable of reaching the bearings. Therefore, at very high rotational speeds, the lubrication of the bearing is not as good, with a resultant reduction of the load-bearing capacity.

It is known that every rotor needs a set of bearings at each end of a shaft, of which one 'fixed' set of bearings absorbs the full axial load and a part of the radial load, and one 'free' set of bearings absorbs the rest of the radial load but is otherwise axially free.

Since the compression of gas generates a great deal of heat, one set of bearings must be free in order to absorb the inevitable thermal expansion of the rotor.

This implies that the fixed set of bearings must support a high axial load as well as a radial load. Since bearings are typically suited to support either primarily a radial load or primarily an axial load, the fixed set of bearings will typically consist of a minimum of two bearings.

A first possibility is a set of bearings consisting of one bearing for the radial load, which is preferably axially free, and one bearing for the axial load, which is preferably radially free.

A second possibility is a set of bearings consisting of two bearings, each of which is capable of bearing a part of the radial load and a part of the axial load. In this case, neither of the two bearings can be axially free, since the axial load is distributed over both bearings.

It is also possible to use a set of bearings consisting of three or more bearings, but such sets of bearings are generally more expensive and more complicated, and they tend to be used today only in specific cases, such as screw compressors for high or very high pressures.

There are two known embodiments of such fixed sets of bearings:
a) a combination of a cylinder bearing, typically a single-row cylinder bearing of the NU or N type, and a four-point bearing;
b) two angular contact ball bearings, either positioned back-to-back, i.e. in a so-called O configuration, or with their backs away from each other, i.e. in a so-called X configuration.

NU-type bearings have two fixed collars on the outer ring, and an inner ring without collars. N-type bearings have two fixed collars on the inner ring, and an outer ring without collars.

The known embodiments a) and b) of fixed sets of bearings all have disadvantages.

Even though in embodiment a), the NU bearings are capable of bearing a large radial load and are capable of being well lubricated, a four-point bearing is much harder to lubricate at high speeds because the inner ring is provided with two 'edges'. These 'edges' prevent the easy injection of lubrication fluid into the bearing.

In embodiment b), the angular contact ball bearings must be installed very carefully with the correct pre-load, which makes the assembly very complex. Moreover, the radial load-bearing capacity is smaller than for a cylinder bearing. For the X configuration, lubrication is more laborious, since the lubrication fluid is preferably injected on the side on which the inner ring has no 'edges', such that two nozzles are needed, on both sides of the set of bearings.

Another disadvantage is that for both embodiments, the axial load-bearing capacity is identical in both directions. During operation, the gas forces operate in only one direction, but under certain conditions, for instance during starting up, force may also be exercised in the opposite direction. However, this opposite force is much smaller, and it only exists during very short periods. This means that in both embodiments, the axial load-bearing capacity is chosen as a function of the gas forces, and is therefore over-dimensioned for the aforementioned opposite force.

The result of this is not only a waste of capacity, and therefore of money, but it also unnecessarily limits the maximum possible rotational speed or the speed of the bearing.

U.S. Pat. No. 4,465,446 describes the traditional embodiment a).

U.S. Pat. No. 5,273,413 describes a variant of a fixed set of bearings according to embodiment b) in which the angular contact bearings have a different contact angle. Even though this is an improvement with respect to the traditional embodiment, this variant does not overcome all the aforementioned disadvantages. EP2891764A1 and EP1845265A1 describe a combination of bearings in a compressor.

SUMMARY

The object of the present invention is to offer a solution to at least one of the aforementioned and/or other disadvantages.

For these purposes, the invention has as its subject a screw compressor.

The raceway, also referred to as "race track", refers to the contact surface between the rolling elements and the bearing rings.

One advantage is that such a configuration of bearings has a satisfactorily high radial load-bearing capacity and an asymmetric axial load-bearing capacity. The cylinder bearing provides a relatively large radial load-bearing capacity, the ball bearing is capable of absorbing relatively large axial forces that operate in an axial direction from the ball bearing toward the cylinder bearing, and the cylinder bearing is capable of absorbing relatively small axial forces that operate in an axial direction from the cylinder bearing toward the ball bearing.

This way, the configuration of bearings according to the invention is able to provide the exact load-bearing capacity that is needed for the fixed bearing of a rotor in a screw compressor, which makes this configuration of bearings specifically suitable for high speed applications.

Since there are no collars or 'edges' next to the raceways on the inner bearing rings on the sides of the bearings facing each other, this will simplify the realization of good lubrication.

Since the raceways are easily accessible due to the absence of collars or 'edges' between the two bearings, the raceways can be lubricated well, and used lubrication fluid can easily drain, which also allows for optimal cooling of the set of bearings, even at high speeds.

Next to the respective raceway, the outer rings of the bearings preferably have a smaller inner diameter than the respective raceway, on the side facing the other bearing as well as on the side facing away from the other bearing.

In other words[[:]], the outer rings are provided with collars or 'edges'.

These will guide the rolling elements through the outer rings of the bearings.

In the cylinder bearing this is realized by the two collars on both sides of the cylindrical rolling elements.

In case of the ball bearing, the outer ring will have a raceway at the location of the two aforementioned edges, such that at high speeds, one of these raceways will limit the axial displacement of the ball-shaped rolling elements.

An additional advantage of the two collars on the outer rings is that an oil bath or oil reservoir is created in the outer ring between the two collars. When starting up the screw compressor element, lubrication of the balls will be provided immediately by way of the oil present in the aforementioned oil bath. Such an oil bath or oil reservoir does not exist or barely exists in case of an angular contact bearing, because its outer ring has only one collar. As a result, when starting up the machine, the lubrication of the bearing will not start immediately via an oil bath, but only after the oil is supply via one or more nozzles.

According to a preferred feature of the invention, at least one nozzle is arranged between the cylinder bearing and the ball bearing, such that the nozzle is suitable to direct one or more jets of fluid into the cylinder bearing and/or the ball bearing.

Since there are no collars or 'edges' next to the raceways on the inner bearing rings on the sides of the bearings facing each other, the jets of fluid will end up directly in the bearings.

This implies that the raceways will be well lubricated.

In one practical embodiment, the difference between the diameter of the rolling elements of the cylinder bearing and the diameter of the rolling elements of the ball bearing is not greater than 20%, preferably not greater than 10% and yet preferably not greater than 5%.

For high speeds, it is better for the rolling elements to have the same size, since otherwise, one of the bearings may be subject to centrifugal forces to a greater degree than the other bearing, such that as a result, the first bearing will reduce the maximum speed.

This is obviously applicable only when both types of rolling elements are made of the same material or of materials with the same specific weight. If one of the types of rolling elements is made out of a lighter material, it is preferred that they be larger.

In a preferred embodiment, at least one of the rolling elements of the cylinder bearing and/or the ball bearing is made out of a ceramic material, such as, for instance, silicon nitride, zirconium oxide, aluminum oxide, or tungsten carbide.

It is obviously not impossible that all the rolling elements of the cylinder bearing and/or the ball bearing are made out of a ceramic material.

The ceramic rolling element will recondition or 'repair' the raceway while rolling along the raceway, and possibly it will smoothen minor damages to the raceway.

This results in a longer service life of the bearing, in a higher load-bearing capacity, and it increases the maximum speed of the bearing.

By making all the rolling elements out of a ceramic material, the centrifugal forces are reduced to a minimum, since ceramic material is usually much lighter than steel.

In order to make the bearing as light as possible, the cylinder bearing and/or the ball bearing are provided with a cage made out of a polymer.

This polymer may, for instance, be PEEK (polyether ether ketone), polyamide (for instance polyamide 66 or polyamide 4,6) or phenolic resin.

This polymer is preferably fiber-reinforced, for instance with glass fiber or carbon fiber.

This will not only ensure that the bearings are lighter because the polymer is lighter than the traditional materials used for the bearing cage, but the cage will also provide for a certain damping, which is advantageous in terms of absorbing vibrations that may occur at high speeds.

The invention also relates to a machine.

This machine may be a compressor, an expander, or a vacuum pump.

This machine may also be an oil-free screw, tooth, or roots compressor or an oil-free blower.

In this case, the bearings are preferably mounted on a rotor shaft on the outlet side of the compressor or the blower.

BRIEF DESCRIPTION OF THE DRAWINGS

In order to better demonstrate the features of the invention, some preferred embodiments are described hereinafter, in an exemplary manner and without any restrictive character, of a screw compressor element and of a machine according to the invention, with reference to the accompanying drawings, wherein.

DETAILED DESCRIPTION

Figure 1:
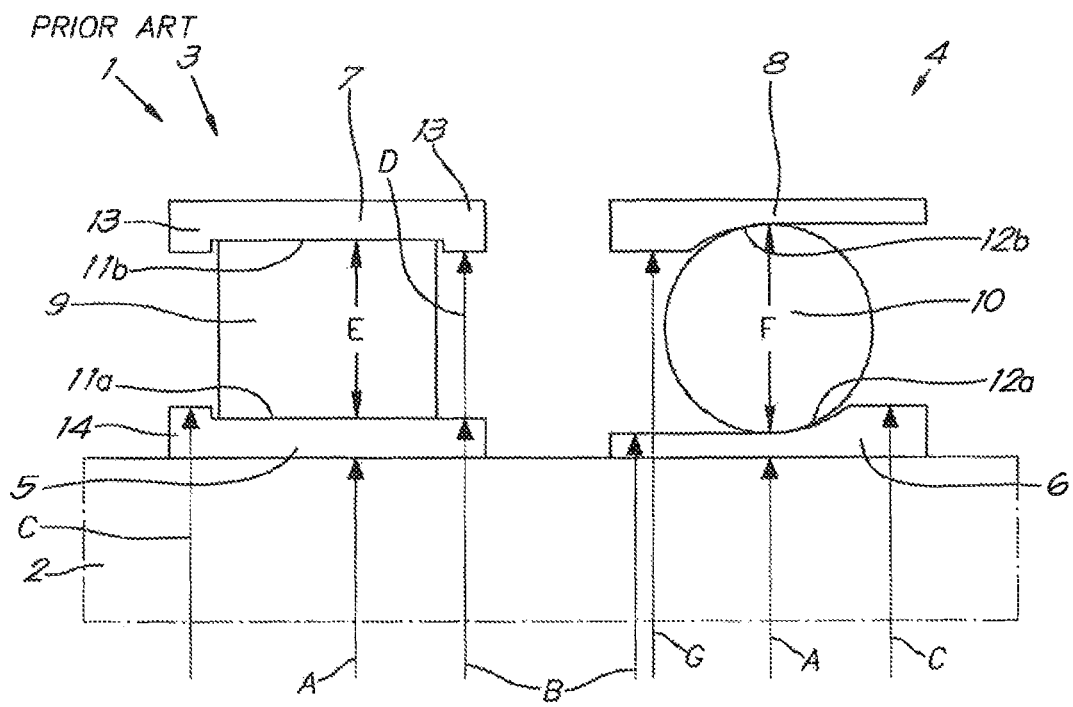
FIG. 1 is a schematic representation of a part of a screw compressor element according to prior art.

The set of bearings 1 in a screw compressor element according to prior art as shown in FIG. 1 relates to a fixed set of bearings 1, mounted on a shaft 2. The set of bearings 1 contains two bearings 3, 4: a cylinder bearing 3 and a ball bearing 4.

Each bearing 3, 4 has an inner ring 5, 6 and an outer ring 7, 8, with cylindrical rolling elements 9 or ball-shaped rolling elements between them, respectively.

The rolling elements 9, 10 contact the inner ring 5, 6 and the outer ring 7, 8 at the location of the raceway 11a, 11b, 12a, 12b.

As shown in FIG. 1, the nominal inner diameters A of the inner rings 5, 6 are equal. This means that the 'bore hole' of the inner rings 5, 6, i.e. the opening used to arrange the bearings 3, 4 on a shaft 2, is identical.

The cylinder bearing 3 is a bearing of the NJ type: the outer ring 7 is provided with two collars 13; the inner ring 5 is provided with one collar 14.

As shown in FIG. 1, the collar 14 on the inner ring 5 faces away from the ball bearing 4.

By using an NJ bearing, the inner ring 5 has a smaller outer diameter B next to the raceway 11a on the side facing the ball bearing 4, and a larger outer diameter C next to the raceway 11a on the other side.

Next to the raceway 11b, the outer ring 7 of the cylinder bearing 3 also has on both sides of the raceway 11b a smaller inner diameter D than the raceway 11b, because the outer ring 7 is provided with two collars 13.

The ball bearing 4 in this case is an angular contact bearing, wherein next to the raceway 12a, on the side facing the cylinder bearing 3, the inner ring 6 has a smaller outer diameter B than the raceway 12a on the inner ring 6.

In other words: the inner ring 6 of the ball bearing 4 has no 'edge' on the side of the cylinder bearing 3.

Next to the raceway 12a, on the side facing away from the cylinder bearing 3, the inner ring 6 has a larger outer diameter C than the raceway 12a on the inner ring 6.

Figure 2:
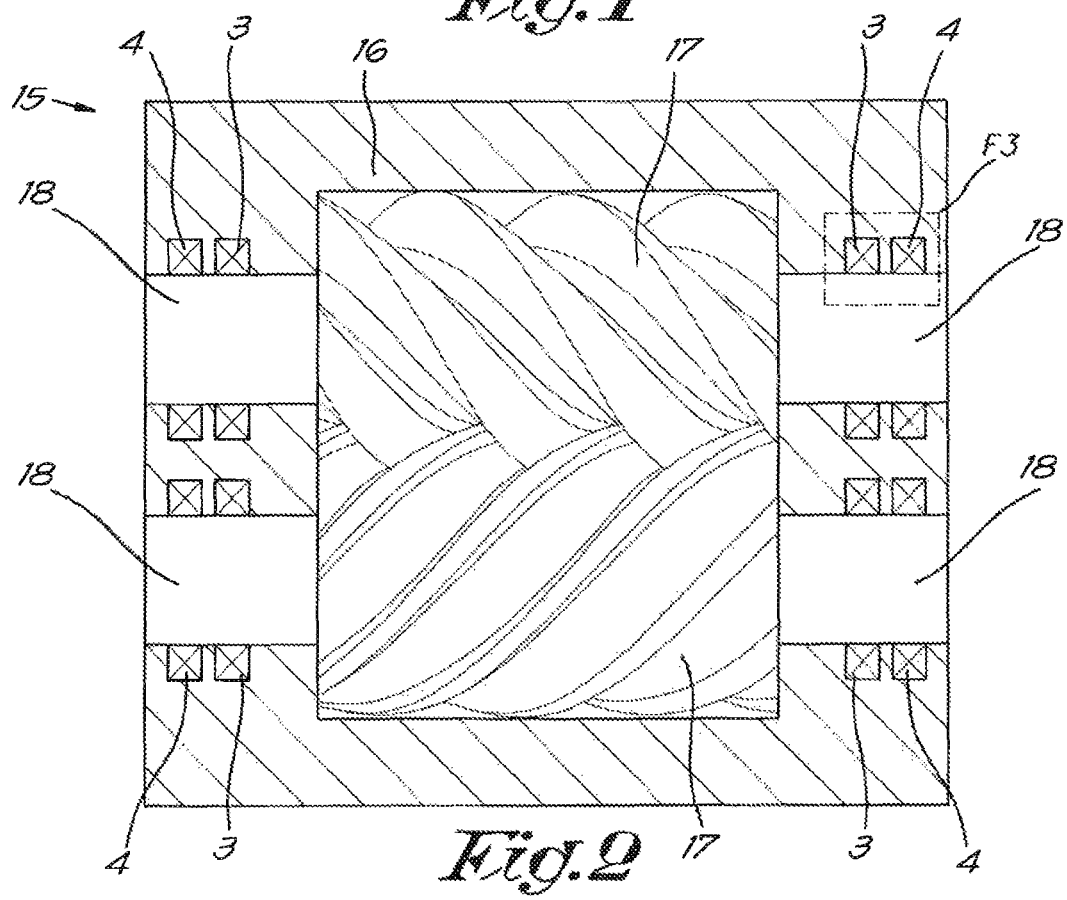
FIG. 2 is a schematic representation of a screw compressor according to the invention.

FIG. 2 is a schematic representation of a screw compressor element according to the invention.

The screw compressor element 15 is provided with a housing 16, in which a rotor 17 is rotatably arranged. In this case, two such rotors 17 are arranged, but this is not necessary in terms of the invention.

The rotors 17 are borne by way of their shaft 18 by bearings 3, 4 in the housing 16.

Even though in the example shown, both ends of the shaft 18 of both rotors 17 are borne by way of two bearings 3, 4 in the housing 16, it is also possible that only one end of the shaft 18 or only one of the two rotors 17 is borne with two bearings 3, 4 in the housing 16.

Figure 3:
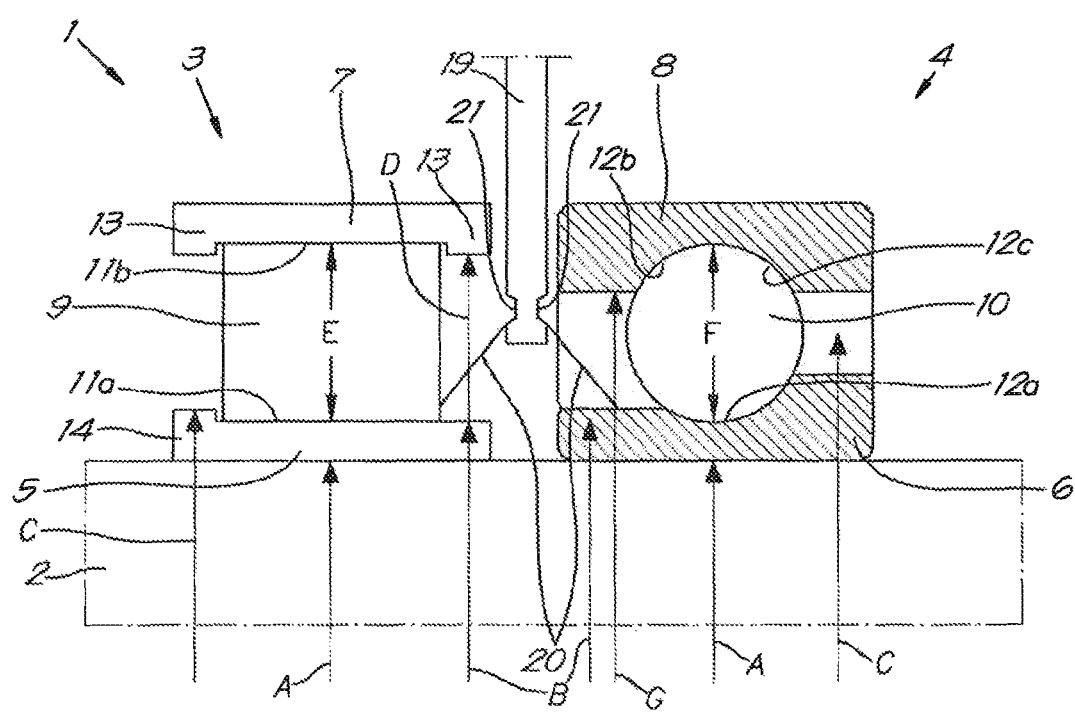
FIG. 3 is a schematic representation of the part that is marked in FIG. 2 with reference marker F3.

FIG. 3 shows a part of the screw compressor element 15 according to the invention from FIG. 2, and more specifically an end of a shaft 18 of one of the rotors 17 with the two bearings 3, 4. As is clearly visible in this detail figure, the one bearing 3 is a cylinder bearing, and the other bearing 4 is a ball bearing.

In the shown example, the cylinder bearing 3 is the same as in FIG. 1, but for this cylinder bearing 3, for instance, the following types may be used:

- an NJ bearing as shown in FIG. 1, in which the cylinder bearing 3 has two fixed collars 13 on the outer ring 7 and one collar 14 on the inner ring 5;
- an NJP bearing, in which the cylinder bearing 3 has two fixed collars 13 on the outer ring 7 and one collar 14 on the inner ring 5; or
- an NU bearing with an angle ring, in which the cylinder bearing 3 has two fixed collars 13 on the outer ring 7 and an angle ring on the inner ring 5, wherein in the NJ bearing, the collar 14 may be of a fixed type, and in the NJP bearing the collar 14 may be of a loose type.

The ball bearing 4 is different from the one in the configuration shown in FIG. 1. In this case, the ball bearing 4 is a three-point bearing, more specifically a bearing that has two raceways 12b and 12c on the outer ring 8 and one raceway 12a on the inner ring 6. The ball bearing 4 is therefore not an angular contact ball bearing.

An example of a suitable ball bearing 4 is described, for instance, in US 2016/0312823 A1 in the name of Aktiebolaget SKF. The description of this American patent application according to paragraphs [0022] to [0038] of US 2016/0312823 A1 is integrally incorporated by reference in the present application.

Alternatively, the ball bearing 4 may consist of a four-point bearing, of which the inner ring 6 as well as the outer ring 8 have two raceways 12a, 12b, 12c.

In this case, though not necessarily, the contact angles of the two raceways 12b and 12c are different.

Whenever the speed increases, the rolling elements 10 will experience an outward radial centrifugal force. This will involve a certain axial displacement.

Due to the presence of the second raceway 12c, the rolling elements will roll on the second raceway 12c at high speeds, and the aforementioned axial displacement will be reduced to a minimum.

This will ensure that the set of bearings 1 can function optimally despite the high speeds. Furthermore, the axial displacement of the rotor on which the set of bearings 1 is positioned as a fixed bearing will be limited, such that there will be little or no increase of the play at the tip, and therefore little or no extra losses in the screw compressor due to leakages.

Furthermore, next to the raceways 12b, 12c, on the side facing the cylinder bearing 3 as well as on the side facing away from the cylinder bearing 3, the outer ring 8 of the ball bearing 4 has a smaller inner diameter G than the raceways 12b, 12c.

The diameter E of the cylindrical rolling elements 9 is equal in this case to the diameter F of the ball-shaped rolling elements 10.

Because both types of rolling elements 9, 10 are made of the same material, the centrifugal forces will be of a similar magnitude.

However, a difference in diameter E, F between the rolling elements 9, 10 of the two bearings 3, 4 cannot be ruled out. This difference is preferably less than 20%, more preferably less than 10% and most preferably not greater than 5%, such that the difference in the centrifugal forces can be limited in as much as possible.

Even though FIG. 3 does not show a bearing cage, it can obviously not be excluded that one or both of the two bearings 3, 4 has a bearing cage.

As shown in FIG. 3, a nozzle 19 is arranged between the ball bearing 4 and the cylinder bearing 3.

This nozzle 19 can direct jets 20 of lubrication fluid into the cylinder bearing 3 and/or the ball bearing 4.

In this case, the nozzle 19 will direct two jets 20 of fluid, one at the cylinder bearing 3 and one at the ball bearing 4, respectively.

For these purposes, the nozzle 19 has two openings 21.

It is obviously also possible that two nozzles 19 are provided: one for the cylinder bearing 3, and one for the ball bearing 4. However, in this case, one nozzle 19 is enough.

In this case, the nozzle 19 directs a jet 20 of oil at the bearings 3, 4. It can obviously not be ruled out that another liquid be used, for instance water.

If one or both bearings 3, 4 are provided with a bearing cage, preferably, at least one nozzle 19 is arranged between the cylinder bearing 3 and the ball bearing 4, wherein the nozzle 19 is suited for aiming a jet 20 of lubrication fluid between the cage of the cylinder bearing 3 and the inner ring 5, and/or between the cage of the ball bearing 4 and the inner ring 6, such that a big part of the lubrication fluid ends up on raceways, preferably on the raceways 11a, 12a of the inner rings 5, 6.

The bearings 3 and 4 from FIG. 3, and by extension, any set of bearings 1 according to the invention, are suited for being used at speeds higher than $1*10^6$ $nd_m$ [millimeter x revolutions per minute], preferably higher than $1.25*10^6$ $nd_m$, and more preferably higher than $1.5*10^6$ $nd_m$.

Due to the specific features of a set of bearings 1 according to the invention, the disadvantages of the known sets of bearings at high speeds will not occur, such that the set of bearings 1 may be used at such high speeds.

For further clarification: Some additional explanations are given below of the type of bearing that can be used as a ball bearing 4 in a screw compressor element 15 or in another machine according to the invention. This explanation is taken from US 2016/0312823 A1 in order to make it possible to include features such as those described therein in the claims of the present patent application, to the extent that such should turn out to be necessary in light of earlier publications of which the applicants are currently still unaware. After all, it was demonstrated that the specific application of a three-point bearing as described in US 2016/0312823 A1 leads to surprisingly good results in the specific application of a screw compressor element 15.

It is clear that the scope of protection of the present invention is not limited to this specific configuration, but rather, that it should be considered a preferred embodiment.

A preferred roller bearing 4 comprises an outer ring and an inner ring. Between the inner ring and the outer ring, a number of rolling elements are arranged. The outer ring contains at least one raceway for rolling elements more than the inner ring. The rolling elements are arranged in a single row, they are embodied as balls and are preferably encased in a cage. In one embodiment, the outer ring contains an additional and/or second raceway on a radially inwards-facing surface on which the first raceway is arranged as well. The two raceways of the outer ring are preferably symmetrical with respect to each other. The outer ring may be embodied as the conventional outer ring of a four-point bearing or as an outer ring of a similar design. In a preferred embodiment, the inner ring comprises exactly one raceway. The raceway of the inner ring is preferably arranged diagonally with respect to the first raceway of the outer ring. The inner ring is arranged concentrically within the outer ring.

The outer ring may be provided with two circular arc segments on its radially inward-facing surface, each of these arc segments comprising one of the raceways of the outer ring. A curvature radius of the circular arc segments may, for instance, be larger than a factor 1.01; 1.02; 1.03; 1.04; 1.05; 1.06; 1.07; 1.08; 1.09, or 1.20 than a jet of the rolling element. At one point, the aforementioned radially inward facing surface may have a curve or a discontinuity, such that during operation, the rolling elements run only on the two raceways and have no further contact with that surface. This point may be, for instance, at the radially outermost position.

The two raceways on the outer ring may be spaced axially at a distance from each other, this distance being larger than zero. The raceways preferably extend along the entire outer ring in the circumferential direction.

Even though all the variants of the invention shown and described above feature a compressor element 15, it is not excluded that the invention relates to a different machine, wherein this machine is provided with a housing in which a rotor is rotatably arranged by way of two bearings 3, 4, respectively a cylinder bearing 3 and a ball bearing 4.

This machine may be an oil-free screw compressor, blower, expander, or vacuum pump.

The aforementioned oil-free screw compressor comprises one or more of the compressor elements 15 shown and described above.

It is possible that in all the variants shown and described above, the bearings 3, 4 have mutually switched positions, such that collars or 'edges' are now located next to the raceways 11a, 12a on the inner bearing rings 5, 6 on the inward-facing side of the bearings 3, 4.

This means that the bearings 3, 4 have collars or 'edges' next to the raceways 11a, 12a on the inner bearing rings 5, 6 that are facing each other, such that next to the respective raceway 11a, 12a, the inner rings 5, 6 of the aforementioned bearings 3, 4 have a smaller outer diameter B than the respective raceway 11a, 12a on the side facing away from the other bearing 3, 4 and in that next to the respective raceway 11a, 12a, the inner rings 5, 6 of the bearings have a greater outer diameter C, D than the respective raceway 11a, 11b on the side facing the other bearing 3, 4.

Thus, the bearings will be positioned 'back-to-back' rather than 'face-to-face', as in FIG. 3.

In such a 'back-to-back' configuration of the bearings 3, 4, preferably, two nozzles 19 are used, on either side of the set of bearings 1.

Thus, the nozzles 19 can inject a fluid on the side of the bearings 3, 4 on which the inner ring 5, 6 has no collar or 'edge'.

The present invention is in no way limited to the embodiments described in the examples and shown in the figures, but a machine and/or a screw compressor element according to the invention may be realized in a variety of forms and dimensions without falling outside the scope of the invention.

The invention claimed is:

1. A screw compressor element comprising:
   a housing;
   a cylinder bearing including an inner ring, an outer ring, a raceway, and a cylindrical rolling element that contacts the inner ring and the outer ring at a location of the raceway thereof;
   a ball bearing including an inner ring, an outer ring, a raceway, and a ball shaped rolling element that contacts the inner ring and the outer ring at a location of the raceway thereof; and
   a nozzle arranged in a space, between the cylinder bearing and the ball bearing, and comprising a first outlet, positioned and configured to direct a first jet of lubrication fluid into the cylinder bearing, and a second outlet positioned and configured to direct a second jet of lubrication fluid into the ball bearing, wherein portions of each of the inner rings of the respective cylinder bearing and the ball bearing, at respective locations next to the respective raceways of the cylinder bearing and the ball bearing and facing away from the other of the respective cylinder bearing and the ball bearing, have greater outer diameters than diameters of the respective raceways, portions of each of the outer rings of the respective cylinder bearing and the ball bearing, at respective locations next to the respective raceways of the cylinder bearing and the ball bearing and both facing to and away from the other of the respective cylinder bearing and the ball bearing, have smaller inner diameters than the diameters of the respective raceways of the cylinder bearing and the ball bearing, wherein a rotor is rotatably arranged by way of the cylinder bearing and the ball bearing, and the smaller inner diameters of the portions of the outer ring of the ball bearing are at least one of:
 a. equal to each other, and
 b. at least one of the smaller inner diameters of the portions of the outer ring of the ball bearing is smaller than each of the smaller inner diameters of the portions of the outer ring of the cylindrical ball bearing.

2. The screw compressor element according to claim 1, wherein the inner diameters of the inner rings of the cylinder bearing and the ball bearing are identical.

3. The screw compressor element according to claim 1, wherein the cylinder bearing is provided with two fixed collars on the outer ring thereof and one fixed collar on the inner ring thereof, or the cylinder bearing is provided with two fixed collars on the outer ring thereof and one loose collar on the inner ring thereof.

4. The screw compressor element according to claim 1, wherein a difference between diameters of the cylindrical rolling element and the ball shaped rolling element is not greater than 20%.

5. The screw compressor element according to claim 4, wherein the difference between the diameters of the cylindrical rolling element and the ball shaped rolling element is not greater than 10%.

6. The screw compressor element according to claim 4, wherein the difference between the diameters of the cylindrical rolling element and the ball shaped rolling element is not greater than 5%.

7. The screw compressor element according to claim 1, wherein at least one of the cylindrical rolling element and the ball shaped rolling element is made out of a ceramic material.

8. The screw compressor element according to claim 7, wherein both of the cylindrical rolling element and the ball shaped rolling element are made out of a ceramic material.

9. The screw compressor element according to claim 1, wherein the outer ring of the ball bearing is provided with two raceways.

10. The screw compressor element according to claim 9, wherein contact angles on the two raceways of the outer ring of the ball bearing are different.

11. The screw compressor element according to claim 1, wherein the cylindrical bearing and the ball bearing are suitable for being used at speeds higher than $1*106$ ndm [millimeters×revolutions per minute].

12. The screw compressor element according to claim 11, wherein the cylindrical bearing and the ball bearing are suitable for being used at speeds higher than $1.25*106$ ndm.

13. The screw compressor element according to claim 11, wherein the cylindrical bearing the ball bearing are suitable for being used at speeds higher than $1.5*106$ ndm.

14. A machine comprising the screw compressor element according to claim 1, wherein the machine is one of the group of:
 a compressor;
 a blower;
 an expander; and
 a vacuum pump.

15. The screw compressor element according to claim 1, wherein the smaller inner diameters of the portions of the outer ring of the ball bearing are both of:
 a. equal to each other, and
 b. such that at least one of the smaller inner diameters of the portions of the outer ring of the ball bearing is smaller than each of the smaller inner diameters of the portions of the outer ring of the cylindrical ball bearing.

* * * * *